(12) United States Patent
Claesson et al.

(10) Patent No.: US 12,038,762 B2
(45) Date of Patent: Jul. 16, 2024

(54) SAFETY METHOD, A CONTROL DEVICE, A VEHICLE, A COMPUTER PROGRAM AND A COMPUTER-READABLE MEDIUM

(71) Applicant: Scania CV AB, Södertälje (SE)

(72) Inventors: André Claesson, Tullinge (SE); Robert Sjödin, Nyköping (SE); Linus Ährlig, Västerhaninge (SE); Sami Teppola, Nykvarn (SE); Tomas Skeppström, Södertälje (SE); Mikko Kallio, Hölö (SE); Morgan Colling, Hölö (SE)

(73) Assignee: Scania CV AB, Södertälje (SE)

( * ) Notice: Subject to any disclaimer, the term of this patent is extended or adjusted under 35 U.S.C. 154(b) by 296 days.

(21) Appl. No.: 17/297,085

(22) PCT Filed: Oct. 30, 2019

(86) PCT No.: PCT/SE2019/051088
§ 371 (c)(1),
(2) Date: May 26, 2021

(87) PCT Pub. No.: WO2020/117112
PCT Pub. Date: Jun. 11, 2020

(65) Prior Publication Data
US 2022/0026922 A1    Jan. 27, 2022

(30) Foreign Application Priority Data

Dec. 7, 2018  (SE) .................................. 1851522-1

(51) Int. Cl.
*G05D 1/02*   (2020.01)
*B60P 3/12*   (2006.01)
(Continued)

(52) U.S. Cl.
CPC .............. *G05D 1/0287* (2013.01); *B60P 3/12* (2013.01); *B62D 63/025* (2013.01); *G05D 1/0022* (2013.01); *H04W 4/46* (2018.02)

(58) Field of Classification Search
CPC .............. G05D 1/0287; G05D 1/0022; G05D 2201/0213; G05D 1/0291; G05D 1/0027;
(Continued)

(56) References Cited

U.S. PATENT DOCUMENTS 5,228,522 A * 7/1993 Stufflebeam ........... A01B 63/11
                                                                172/671
9,522,624 B1   12/2016 Williams
(Continued)

FOREIGN PATENT DOCUMENTS

WO    2015076736 A1    5/2015

OTHER PUBLICATIONS

Scania CV AB, International Patent Application No. PCT/SE2019/051088, International Search Report, Jan. 9, 2020.
(Continued)

*Primary Examiner* — Rodney A Butler
(74) *Attorney, Agent, or Firm* — Moore & Van Allen PLLC; W. Kevin Ransom

(57) ABSTRACT

The invention relates to a method, performed by a control device associated with a vehicle assembled from a set of modules, the vehicle comprising: at least one drive module; and at least one functional module, wherein the at least one drive module comprises a pair of wheels and is configured to be autonomously operated and drive the assembled vehicle, the method comprising: identifying an erroneous function of the at least one drive module; physically connecting an autonomously operated assisting drive module to the at least one drive module; and controlling the assisting (Continued)

drive module to perform at least the erroneous function of the at least one drive module.

19 Claims, 6 Drawing Sheets

(51) Int. Cl.
  *B62D 63/02* (2006.01)
  *G05D 1/00* (2024.01)
  *H04W 4/46* (2018.01)
(58) Field of Classification Search
  CPC ............ B60P 3/12; B60P 3/42; B62D 63/025; H04W 4/46; H04W 4/44; B60L 3/0061; B60L 3/0092; B60L 2200/28; B60L 2220/42; Y02T 10/64; B60D 1/00
  See application file for complete search history.

(56) References Cited

U.S. PATENT DOCUMENTS

| | | | |
|---|---|---|---|
| 9,816,283 | B2 | 11/2017 | Nordbruch et al. |
| 2007/0194557 | A1 | 8/2007 | Caporali et al. |
| 2011/0170994 | A1 | 7/2011 | Coombs et al. |
| 2015/0239436 | A1 | 8/2015 | Kanai et al. |
| 2016/0115702 | A1 | 4/2016 | Nordbruch et al. |
| 2016/0152288 | A1* | 6/2016 | Riedel .................. B62D 63/025 29/434 |
| 2017/0032585 | A1 | 2/2017 | Stenneth |
| 2017/0174092 | A1 | 6/2017 | Kahnke |
| 2018/0050626 | A1 | 2/2018 | Delp et al. |
| 2018/0345971 | A1 | 12/2018 | Birnschein et al. |

OTHER PUBLICATIONS

Scania CV AB, International Patent Application No. PCT/SE2019/051088, Written Opinion, Jan. 9, 2020.
Scania CV AB, Swedish Patent Application No. 1851522-1, Office Action, Jun. 10, 2019.
Scania CV AB, Chinese Patent Application No. 201980074520.8, First Office Action, Aug. 18, 2022.
Scania CV AB, International Application No. PCT/SE2019/051088, International Preliminary Report on Patentability, Jun. 8, 2021.
Scania CV AB, European Patent Application No. 19893602.3, Extended European Search Report, Jul. 4, 2022.
Scania CV AB, Chinese Patent Application No. 201980074520.8, Second Office Action, Apr. 22, 2023.
Scania CV AB, Brazilian Patent Application No. BR112021009199-8, Preliminary Office Action, Jun. 27, 2023.

* cited by examiner

SAFETY METHOD, A CONTROL DEVICE, A VEHICLE, A COMPUTER PROGRAM AND A COMPUTER-READABLE MEDIUM

CROSS-REFERENCE TO RELATED APPLICATIONS

This application is a National Stage Patent Application (filed under 35 § U.S.C. 371) of PCT/SE2019/051088, filed Oct. 30, 2019 of the same title, which, in turn claims priority to Swedish Patent Application No. 1851522-1 filed Dec. 7, 2018 of the same title; the contents of each of which are hereby incorporated by reference.

FIELD OF THE INVENTION

The present invention relates to a method for a vehicle assembled from a set of modules. More specifically the present invention relates to a method for handling a situation where a module of the vehicle is malfunctioning. The present invention also relates to a control device, a computer program, a computer-readable medium and a system.

BACKGROUND OF THE INVENTION

There are situations when a vehicle, for some reason, involuntary has to stop in the traffic. For example, the vehicle may get a flat tire; the engine may break down or similar. In such a situation, the vehicle standing still may pose a risk for its passengers and other road users. The vehicle may therefore need to be moved away from the risky situation as soon as possible. However, towing the vehicle to a service station or similar may be a time-consuming and complicated process. If the vehicle is autonomously operated, this may further complicate the process since no human is available to call the towing company and explain the situation. Document US 2016/0115702 A1 discloses a towing robot used to tow an autonomously operated vehicle in the event that the error occurs within a parking lot. The towing robot receives instructions to tow the vehicle to a predetermined position.

Modularized vehicles are becoming more common and there are, for example, known solutions where a truck can be rebuilt by changing a concrete mixer to a loading platform. This increases the flexibility and two different functions can be achieved by means of one single vehicle. In the event that a modularized vehicle has to stop in the traffic due to a malfunctioning module, the malfunctioning module may be replaced. However, also a modularized vehicle needs to be towed to a service station or similar to replace the malfunctioning module.

SUMMARY OF THE INVENTION

Despite known solutions in the field, it would be desirable to achieve a method for a vehicle assembled from a set of modules, which solves or at least alleviates at least some of the drawbacks of the prior art.

An object of the present invention is therefore to achieve a new and advantageous method for a vehicle assembled from a set of modules, which method increases the safety in the traffic. Another object of the present invention is to achieve a new and advantageous method for a vehicle assembled from a set of modules, which method reduces the vehicle off road (VOR) time and quickly can move the vehicle to a service station. Another object of the invention is to achieve a new and advantageous control device, vehicle, computer program and computer-readable medium.

The herein mentioned objects are achieved by a method, a control device, a computer program, a computer-readable medium and a system according to the independent claims.

Hence, according to an aspect of the present invention a method, performed by a control device associated with a vehicle assembled from a set of modules, is provided. The vehicle comprises: at least one drive module; and at least one functional module, wherein the at least one drive module comprises a pair of wheels and is configured to be autonomously operated and drive the assembled vehicle. The method comprises: identifying an erroneous function of the at least one drive module; physically connecting an autonomously operated assisting drive module to the at least one drive module; and controlling the assisting drive module to perform at least the erroneous function of the at least one drive module.

According to another aspect of the invention, a control device associated with a vehicle assembled from a set of modules is provided. The vehicle comprises: at least one drive module; and at least one functional module, wherein the at least one drive module comprises a pair of wheels and is configured to be autonomously operated and drive the assembled vehicle. The control device is configured to: identify an erroneous function of the at least one drive module; physically connect an autonomously operated assisting drive module to the at least one drive module; and control the assisting drive module to perform at least the erroneous function of the at least one drive module.

According to yet another aspect of the invention a system associated with a vehicle assembled from a set of modules is provided. The system comprises: an assembled vehicle; an assisting drive module; and a control center, wherein the vehicle comprises at least one drive module; and at least one functional module, wherein the at least one drive module comprises a pair of wheels and is configured to be autonomously operated and drive the assembled vehicle, and wherein the system further comprises a control device as disclosed herein.

Vehicles of today are typically manufactured for a specific purpose, e.g. a bus is manufactured for transporting people and a truck is manufactured for transporting goods. Such vehicles are typically manufactured and completely assembled in a factory or they may be partly assembled in a factory and completed at a body manufacturer. Once the vehicle is assembled, the vehicle will only be used for the specific purpose. Thus, a bus will only be used as a bus and a garbage truck will only be used as a garbage truck. Different vehicles are thus needed for different purposes, which may require a large fleet of vehicles and which may be very costly. Assembling a vehicle from a set of modules makes it possible to dynamically assemble a modularised vehicle depending on a current mission or function to be performed. This way, from the same set of modules, for example a truck, a garbage truck, a bus or a snowplough can be assembled. Not only will this result in an increased flexibility, but the cost for a vehicle owner will decrease significantly compared to having a plurality of different vehicles for different applications. The vehicle is autonomously operated by means of the at least one drive module. Also, by using at least one autonomously operated drive module, the drive module may autonomously/automatically perform physical and electrical connection/disconnection with a second module. This way, no manual work is required and the assembly of the vehicle is less cumbersome and much more time efficient.

A malfunctioning drive module may pose a potential risk in the traffic and it may also inhibit the vehicle from continuing its operation, depending on the error. For example, the drive module may have a flat tire, a light on the drive module may be broken or a brake or the propulsion unit of the drive module may malfunction. By connecting an assisting drive module to the malfunctioning drive module, and controlling the assisting drive module to perform at least the erroneous function(s), the vehicle can continue its operation and may thereby be operated to a service station where the malfunctioning drive module can be repaired. By physically connecting the assisting drive module to the vehicle, the assisting drive module temporarily forms part of the vehicle. The method according to the present disclosure may thus be referred to as a limp home method. Also, since the assisting drive module is autonomously operated the assisting drive module can transport itself to the location of the vehicle. The physical connection of the assisting drive module may also be performed autonomously. A time-efficient and easy way of handling a malfunctioning vehicle is thereby achieved, which reduces the vehicle off road (VOR) time.

Further objects, advantages and novel features of the present invention will become apparent to one skilled in the art from the following details, and also by putting the invention into practice. Whereas examples of the invention are described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION

Figure 1:
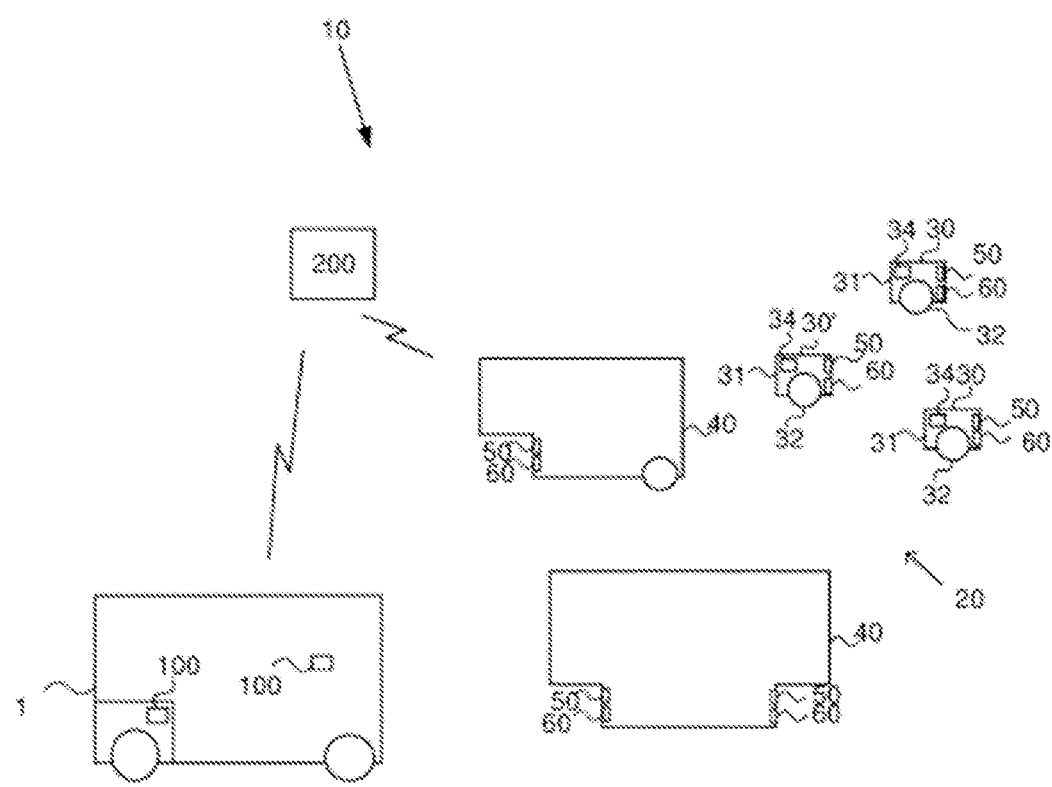
FIG. 1 schematically illustrates a system according to an example.

During operation of a vehicle assembled from a set of modules, also called a modularized vehicle, situations may occur where a drive module of the vehicle for some reason malfunctions. In such a situation, the vehicle, just as any conventional vehicle, may pose a risk for other road users. To ensure safety, a method according to the disclosure has been developed. The present disclosure is applicable on all sorts of modularized road vehicles. However, the disclosure may relate to heavy vehicles, such as buses, trucks etc. Specifically, the present disclosure may relate to vehicles for use on public roads.

According to an aspect of the present disclosure a method, performed by a control device associated with a vehicle assembled from a set of modules, is provided. The vehicle comprises: at least one drive module; and at least one functional module, wherein the at least one drive module comprises a pair of wheels and is configured to be autonomously operated and drive the assembled vehicle. The method comprises: identifying an erroneous function of the at least one drive module; physically connecting an autonomously operated assisting drive module to the at least one drive module; and controlling the assisting drive module to perform at least the erroneous function of the at least one drive module.

An erroneous function of the at least one drive module may be referred to as an error, a non-functioning function or malfunction of the at least one drive module. An erroneous function is thus a function of the at least one drive module that is not functioning satisfactory. An erroneous function of the at least one drive module may be a flat tire, broken lights, a malfunctioning brake, a malfunctioning propulsion unit, a malfunctioning control unit or anything which is not functioning as it should. The at least one drive module having an erroneous function may be referred to as the malfunctioning drive module.

Thus, according to an example, identifying an erroneous function may comprise identifying an erroneous function related to a hardware of the at least one drive module and/or identifying an erroneous function related to software of the at least one drive module.

The set of modules from which the vehicle is assembled may comprise a plurality of drive modules and a plurality of functional modules. The assisting drive module may be comprised in the set of modules. The different drive modules of the set of modules may be identical or the drive modules may for example have different types/sizes of wheels, different suspension, different power capacity and/or different charge capacity. The at least one drive module and the assisting drive module may thus be identically configured. Each drive module may comprise a body. In one example, the at least one pair of wheels are arranged on opposite sides of the body of the drive module. In an example, the drive module has only one pair of wheels. The propulsion unit of the drive module may be an electric machine, connected to the wheels. The pair of wheels of the drive module may thus be referred to as drive wheels. In one example, the drive module(s) comprises two electrical machines, one connected to each wheel. The electric machines may be arranged in the rim of the wheels. The wheels of the drive module can thus be driven independently of each other. The electric machines may also work as generators and generate electric power when braking the wheels. The drive module may also comprise a steering system connected to the wheels. This way, the drive module is steerable. The drive module may also comprise a brake system for braking the wheels. Suitably, the brake system comprises a wheel brake for each wheel of the drive module. Redundancy is achieved in that the drive module can be steered by means of the electrical machines and/or the wheel brakes in the event that the steering system malfunctions. In one example, the drive module further comprises at least one energy storage unit for providing the propulsion unit with energy. The energy storage unit may be an electric battery. The electric battery may be rechargeable. The drive modules being configured to be autonomously operated means that the drive modules each comprises a plurality of sensors and systems for steering and driving the drive modules automatically as independent units according to conventional methods. According to an example, the drive modules comprise a navigation system and sensors for detecting objects in the surrounding of the drive modules. The drive modules may be referred to as an autonomously operated vehicle in the sense that they are allowed to operate on public roads.

Each functional module of the set of modules is configured to perform a predetermined function while being part of an assembled vehicle. In one example, the functional module is configured to accommodate or support a load. The functional module may be configured for accommodating passengers and may thus form a bus when being assembled with at least one drive module. The functional module may alternatively be configured for transporting goods and may thus form a truck when being assembled with at least one drive module. The functional module may be any of a garbage truck body, a loading platform, a fork arrangement for a forklift, and a snowplough. The functional module may comprise trailing wheels, which are not driven or steerable. A functional module cannot move on its own but needs to be connected to at least one drive module to be able to move, the functional module and the drive module thereby together forming a vehicle. The functional module may comprise an energy storage unit, such as a battery.

It is to be understood that the control device performing the disclosed method may be implemented as a separate entity or distributed in two or more physical entities. The control device may comprise one or more control units and/or computers. The control device may thus be implemented or realized by the control device comprising a processor and a memory, the memory comprising instructions, which when executed by the processor causes the control device to perform the herein disclosed method steps. According to one example, each module of the vehicle may comprise a control unit. The control device may thus comprise control units of each module of the vehicle. The control device may furthermore comprise a control unit of the assisting drive module. The control device may be configured to control the operation of the assisting drive module. The control device may thus be configured to transmit control signals to the various systems and components of the assisting drive module for controlling for example the steering and the propulsion of the assisting drive module. The control device may thereby be adapted to operate the assisting drive module autonomously based on received commands, e.g. from a control center, and based on sensor input regarding its surroundings and positioning. The control device is in that case adapted to receive commands from a remotely located control center and to convert the command into control signals for controlling the various systems and components of the assisting drive module. The control device may be configured to receive data about the surroundings from various sensor devices, and based on this data control the assisting drive module. The control device may additionally or alternatively be comprised in such an external control center. The control center may be referred to as an off-board system. The control center may be geographically on a distance from the vehicle. Suitably, all modules of the vehicle as well as the assisting drive module are configured to communicate with the control center. The control center may be implemented as a separate entity or distributed in two or more physical entities. The control center may comprise one or more control units, processing units or computers. The control center may be adapted to receive information about missions or functions to be performed and based on this mission/function initiate assembly/disassembly of a vehicle. The control center may also be adapted to assign the assembled vehicles different missions.

Identifying an erroneous function of the at least one drive module of the vehicle may comprise identifying an activated error code in the at least one drive module. As explained above, the control device may comprise a control unit of a control center and/or a control unit of the vehicle and/or a control unit of the assisting drive module. Thus, identifying an erroneous function may be performed by at least one of these control units. The control center may be configured to continuously collect data from the different modules of the vehicle. The control center may thus identify when something is wrong with the at least one drive module. Alternatively, the control unit of the at least one drive module may itself identify an error and inform the control center and/or another control unit of the vehicle of the problem. Identifying an erroneous function of the at least one drive module may thus comprise receiving information about an activated error code. Alternatively, the step of identifying an erroneous function may be based on collected data from different sensors of the at least one drive module and/or the functional module. The control device may comprise a list of predetermined sensor data corresponding to functioning functions, saved in a database. The control device may thus compare the collected data with the list to detect an erroneous function of the at least one drive module. When an erroneous function has been identified, the control device may determine whether the erroneous function is of such a nature that an assisting drive module is required or if the vehicle can be operated on its own.

When an erroneous function of the at least one drive module of the vehicle has been identified, the control center may instruct the vehicle to temporarily disregard the primary mission of the vehicle and initiate the method according to the disclosure. The method may comprise instructing the vehicle to drive to a safe location and stop the vehicle. A safe location may be a location where the vehicle does not pose a risk to other vehicles or at least a location where the vehicle constitutes a reduced risk for other vehicles. The method may further comprise operating/controlling the vehicle to a safe location and stop the vehicle. When the assisting drive module has been connected to the vehicle, the control device may determine if the primary mission can/should be completed or if the vehicle should be operated to the roadside or to a service station.

Physically connecting the assisting drive module may comprise controlling a physical interface of the assisting drive module. The assisting drive module and the at least one drive module of the vehicle may be physically connected to each other through corresponding physical interfaces. Such physical interfaces may be configured in different ways, and may for example comprise coupling units adapted to engage, quick couplings, hooks, cooperating protrusions and recesses or similar. Physically connecting the assisting drive module with the at least one drive module may thus comprise controlling a coupling unit, a quick coupling, a hook or similar of the assisting drive module. For example, physically connecting the assisting drive module with the at least one drive module may comprise controlling a coupling unit to unfold and controlling the assisting drive module to insert the coupling unit in a corresponding recess of the at least one drive module. Each drive module may comprise a physical interface for connection with another module on at least two different sides of the drive module. This way, the drive modules can be connected to other modules in various ways and the flexibility is increased. The different physical interfaces for connection with another module may be identical on all sides of the drive modules. By using a standard interface, which can be used for connection with another drive module as well as a functional module, the flexibility of the drive modules increases and the assembly of a vehicle are facilitated. The physical connection of the assisting drive module may be autonomously performed. Physically connecting the assisting drive module may also comprise instructing the assisting drive module to physically connect with the at least one drive module. The control center may command/instruct the assisting drive module to physically connect with the at least one drive module. The control unit of the assisting drive module may thus receive the instruction and may subsequently control the physical interface, so that the assisting drive module is physically connected to the at least one drive module. Physically connecting the assisting drive module to the at least one drive module may further comprise controlling a physical interface of the at least one drive module. The control unit of the at least one drive module may thus receive instructions from the control center and/or the assisting drive module to physically connect with the assisting drive module, and may subsequently control the physical interface to connect with the assisting drive module. Physically connecting the assisting drive module with the at least one drive module may comprise positioning the assisting drive module, such that the physical interface of the assisting drive module is aligned with the physical interface of the at least one drive module and/or such that the physical interface of the assisting drive module abuts the physical interface of the at least one drive module. Controlling the assisting drive module to connect with the at least one drive module may further comprise identifying the position of the at least one drive module and controlling the assisting drive module to move to that position. Positioning the assisting drive module may be performed by controlling systems for steering and driving the assisting drive module based on sensors on the assisting drive module. The position of the at least one drive module may be identified based on data from sensors on the assisting drive module. Alternatively, the command to connect the assisting drive module with the at least one drive module is transmitted to both the assisting drive module and the at least one drive module and/or the functional module, whereby the at least one drive module and/or the functional module prepares for the connection and starts transmitting a signal. The assisting drive module may then identify the position of the at least one drive module based on this transmitted signal. At least one sensor arranged at the assisting drive module and/or the at least one drive module may be configured to sense when the physical connection has been performed. The at least one sensor device may send a signal to the control device indicating that the connection has been performed. This way, the physical connection is verified.

Controlling the assisting drive module to perform at least the erroneous function of the at least one drive module means that the assisting drive module replaces the at least one drive module, at least with regard to the non-working function(s) of the at least one drive module. The assisting drive module thus takes over the functions that the at least one drive module no longer can perform. The assisting drive module may further be controlled to perform several functions instead of the at least one drive module, even if the at least one drive module can perform such functions. The method may thus comprise determining/selecting which functions the assisting drive module should perform and which functions the at least one drive module should perform. Which functions the assisting drive module should perform and which functions the at least one drive module should perform may depend on the erroneous function of the at least one drive module. As an example, the at least one drive module may have malfunctioning brakes. When the assisting drive module is connected to the at least one drive module, the assisting drive module will constitute the rearmost or the foremost drive module. The assisting drive module may thus perform functions as showing vehicles lights, showing a number plate, driving the vehicle etc. even if these functions are not malfunctioning in the at least one drive module.

According to an example, the method further comprises controlling the at least one drive module and/or the assisting drive module to lift the pair of wheels of the at least one drive module from the ground. This way, the malfunctioning drive module will not interfere with the operation of the vehicle. By connecting the assisting drive module to the at least one drive module the vehicle comprises two closely arranged wheel axles, i.e. a tandem. By lifting the at least one drive module off the ground, the tandem becomes a single axle. This may be particularly advantageous in the event that the at least one drive module cannot or should not be rolling on the ground. Thus, in the event that the at least one drive module for example has a flat tire, the at least one drive module and/or the assisting drive module may be controlled to lift the pair of wheels of the at least one drive module from the ground. By lifting the pair of wheels of the malfunctioning drive module from the ground, the actual wheelbase of the vehicle will be increased. This may affect the steering of the vehicle and the vehicle may therefore be controlled in a different way compared to normal operation of the vehicle. Operation of the vehicle may thus be adapted to the new wheelbase caused by the assisting drive module.

The wheel pair of the at least one drive module may be lifted from the ground by controlling the wheel suspension of the assisting drive module. The wheel suspension of the assisting drive module is suitably vertically controllable to change the position of the wheels in relation to the body. Thus, by controlling the wheel suspension the body of the assisting drive module can be raised or lowered in relation to the ground on which the assisting drive module is standing. The wheel suspension of the assisting drive module may be controlled, such that the body of the assisting drive module is raised in relation to the ground. Since the body of the assisting drive module is physically attached to the body of the at least one drive module, the at least one drive module, and thus the end of the vehicle, will be lifted from the ground when the body of the assisting drive module is raised. Alternatively, the wheel pair of the at least one drive module may be lifted from the ground by controlling the wheel suspension of the at least one drive module. The wheel suspension of the at least one drive module is suitably vertically controllable to change the position of the wheels in relation to the body. Thus, by controlling the wheel suspension the body of the at least one drive module can be raised or lowered in relation to the ground on which the at least one drive module is standing. The wheel suspension of the at least one drive module may be controlled, such that the body of the at least one drive module normally would be lowered in relation to the ground. Since the body of the at least one drive module is connected to the body of the assisting drive module, the body of the at least one drive module will not be lowered but the wheel pair of the at least one drive module will instead be lifted from the ground. The wheel suspension of the at least one drive module may thus be controlled, such that the body and the pair of wheels of the at least one drive module are moved towards each other. In another example, the wheel pair of the at least on drive module may be lifted from the ground by emptying the tires of the wheel pair. By deflating the tires, the wheel pair of the at least one drive module will be lifted from the ground.

According to an example, the method further comprises configuring the at least one drive module and/or the assisting drive module for tandem operation. In this example, the wheel pair of the at least one drive module is not lifted from the ground and the at least one drive module will be involved in the operation of the vehicle. By connecting the assisting drive module to the at least one drive module the vehicle comprises two closely arranged wheel axles, i.e. a tandem. With a tandem, either both or only one of the axles (drive modules) may drive the vehicle and the steering will be affected. Thus, when the assisting drive module is connected to the vehicle, the at least one drive module and/or the assisting drive module may be configured for the tandem operation. As an example, configuring the at least one drive module and/or the assisting drive module for tandem operation may comprise configuring the propulsion of the at least one drive module and/or the assisting drive module. Configuring the at least one drive module and/or the assisting drive module for tandem operation may alternatively or additionally comprise adapting the steering angle of the at least one drive module and/or the assisting drive module. The steering angle of the at least one drive module may be adapted to the steering angle of the assisting drive module, or vice versa, to improve the tandem operation. With the at least one drive module and the assisting drive module arranged in tandem, the at least one drive module and the assisting drive module should not have the same steering angle. If the steering angles are exactly the same when turning the vehicle, excessive wear of the tires may occur and it will be difficult to anticipate how the vehicle will move. This would specifically be the case in tight/narrow turns. Adapting the steering angle of the at least one drive module and/or the assisting drive module may comprise reducing the steering angle of the at least one drive module. Thus, the steering angle of the at least one drive module may be reduced to be smaller compared to the steering angle of the assisting drive module. This way, better control of the vehicle is achieved.

The method may further comprise electrically connecting the assisting drive module with the vehicle. The method may comprise electrically connecting the assisting drive module with the at least one drive module. The modules of the assembled vehicle may be electrically connected with each other via corresponding electrical interfaces. Electrically connecting the assisting drive module with the at least one drive module may comprise activating communication means in the assisting drive module. The communication means of the assisting drive module may be comprised in the electrical interface of the assisting drive module. The electrical interface may be configured to transfer electric energy and/or to transmit and/or receive electric signals. The electrical interface may be a wireless interface and/or a conductive interface. The communication means in the assisting drive module is thus means for transferring electric energy and/or transmitting/receiving electric signals to/from other modules of the vehicle. The communication means may comprise an internal communication network, such as CAN J1939, Flexray, Ethernet, fiber or similar. The communication means may alternatively or additionally comprise a transmitter and/or a receiver for wireless communication. The communication means may be activated by means of controlling a switch, a contactor or similar. In addition to the communication means for communicating with another module, the assisting drive module also comprises wireless communication means for communicating with the control center.

According to an example, the method further comprises controlling the assisting drive module to be autonomously operated to the location of the vehicle. As previously described, the vehicle having a drive module with an erroneous function may be operated to a safe location or may have to stop at a certain location. The method may comprise determining the location of the vehicle. This may be performed based on map data, navigation systems or similar. Suitably, the control center receives coordinates of the location where the vehicle is standing still from the vehicle. The control center may instruct/command an assisting drive module to go to the determined location of the vehicle. The control unit of the assisting drive module may then control the assisting drive module to the location of the vehicle. Alternatively, the assisting drive module is transported to the location of the vehicle by means of another vehicle.

According to an example, controlling the assisting drive module to perform at least the erroneous function comprises appointing the assisting drive module to operate as a master and thereby control the other modules of the vehicle. In an assembled vehicle, one drive module is typically operated as a master and the other modules are operated as slaves. The master will decide how to operate the other modules and thus how to operate the assembled vehicle. It is thus important that all modules can communicate with each other in order for the master to be able to operate the vehicle in an optimal way. However, in the event that the malfunctioning at least one drive module previously was operated as a master, the assisting drive module being connected to the at least one drive module may be appointed master instead. The at least one drive module may thus be appointed to operate as a slave. The control unit of the assisting drive module may thus receive instructions from the control center to operate the assisting drive module as a master or to operate the assisting drive module as a slave. The method may thus comprise changing the module to be operated as a master. The method may comprise appointing the assisting drive module to operate as a master and appointing the previous master module to be operated as a slave. According to another example, the assembled vehicle itself determines which module of the vehicle to operate as a master and which module(s) to operate as slave(s).

Controlling the assisting drive module to perform at least the erroneous function may also comprise controlling the assisting drive module to drive the vehicle by pushing or pulling the vehicle. As previously described, the erroneous function may be related to the propulsion of the at least one drive module and the at least one drive module may not be suitable to drive the vehicle. The assisting drive module may thus receive instructions to drive the vehicle. Depending on where on the vehicle the assisting drive module is connected and depending on the travel direction, the assisting drive module will push or pull the vehicle.

The present disclosure also relates to a computer program comprising instructions which, when the program is executed by a computer, causes the computer to carry out the method disclosed above. The present disclosure further relates to a computer-readable medium comprising instructions, which when executed by a computer causes the computer to carry out the method disclosed above.

According to an aspect of the present disclosure, a control device associated with a vehicle assembled from a set of modules is provided. The vehicle comprises: at least one drive module; and at least one functional module, wherein the at least one drive module comprises a pair of wheels and is configured to be autonomously operated and drive the assembled vehicle. The control device is configured to:

identify an erroneous function of the at least one drive module; physically connect an autonomously operated assisting drive module to the at least one drive module; and control the assisting drive module to perform at least the erroneous function of the at least one drive module.

It will be appreciated that all the embodiments described for the method aspect of the disclosure performed by the control device are also applicable to the control device aspect of the disclosure. That is, the control device may be configured to perform any one of the steps of the method according to the various examples described above.

According to another aspect of the present disclosure, a system associated with a vehicle assembled from a set of modules is provided. The system comprises: an assembled vehicle; an assisting drive module; and a control center, wherein the vehicle comprises at least one drive module; and at least one functional module, wherein the at least one drive module comprises a pair of wheels and is configured to be autonomously operated and drive the assembled vehicle, and wherein the system further comprises a control device as disclosed herein.

The present disclosure will now be further illustrated with reference to the appended figures.

FIG. 1 schematically illustrates a system 10 associated with a vehicle 1 according to an example. The system 10 comprises a vehicle 1 assembled from a set of modules 20; an assisting drive module 30' and a control center 200. The assisting drive module 30' is comprised in the set of modules 20. The assisting drive module 30' may be any drive module 30 in the set of modules 20. The system 10 further comprises a control device 300 as disclosed in FIG. 2. The vehicle 1 comprises at least one control unit 100 configured to communicate with the control center 200. As an example, each module 30, 30', 40 of the set of modules 20 comprises a control unit 100. The control unit(s) 100 and/or the control center 200 may be comprised in the control device 300 as disclosed in FIG. 2. The set of modules 20 comprises a plurality of drive modules 30, 30' and a plurality of functional modules 40. The vehicle 1 comprises at least one drive module 30 and at least one functional module 40, wherein each drive module 30 comprises a body 31, a pair of wheels 32 and a propulsion unit 34, and is configured to be autonomously operated and drive the vehicle 1. Each module 30, 30', 40 in the set of modules 20 comprise at least one interface 50 releasably connectable to a corresponding interface 50 on another module 30, 30', 40. The modules 30, 30', 40 suitably comprise at least one physical interface 50 and at least one electrical interface. By combining drive modules 30, 30' and functional modules 40, different types of vehicles 1 can be achieved. Some vehicles 1 require two drive modules 30, 30' and some vehicles 1 only require one drive module 30, 30', depending on the structural configuration of the functional module 40. Each drive module 30, 30' may comprise a plurality of interfaces 50 for releasable connection with other modules 30, 30', 40. The interface(s) 50 of the drive modules 30, 30' may be arranged on different sides of the drive module 30, 30' and thus enable connection with other modules 30, 30', 40 on multiple sides of the drive module 30, 30'. The interfaces 50 on the drive modules 30, 30' and the functional modules 40 respectively, are suitably arranged on corresponding positions to enable connection between the modules 30, 30', 40. Each module 30, 30', 40 comprise communication means for communication with another module 30, 30', 40. The communication means may form part of the at least one interface 50 of each module 30, 30', 40. The communication means of each module 30, 30', 40 are controlled by the control units 100 of the module 30, 30', 40. The communication means may comprise an internal communication network, such as CAN J1939, Flexray, Ethernet, fiber or similar. The communication means may additionally or alternatively comprise a transmitter and a receiver for wireless communication between the modules 30, 30', 40. The communication means may be activated by means of controlling a switch, a contactor or similar. Each module 30, 30', 40 may also comprise at least one sensor device 60 configured to sense when physical connection or disconnection between two modules 30, 30', 40 has been performed.

Figure 2:
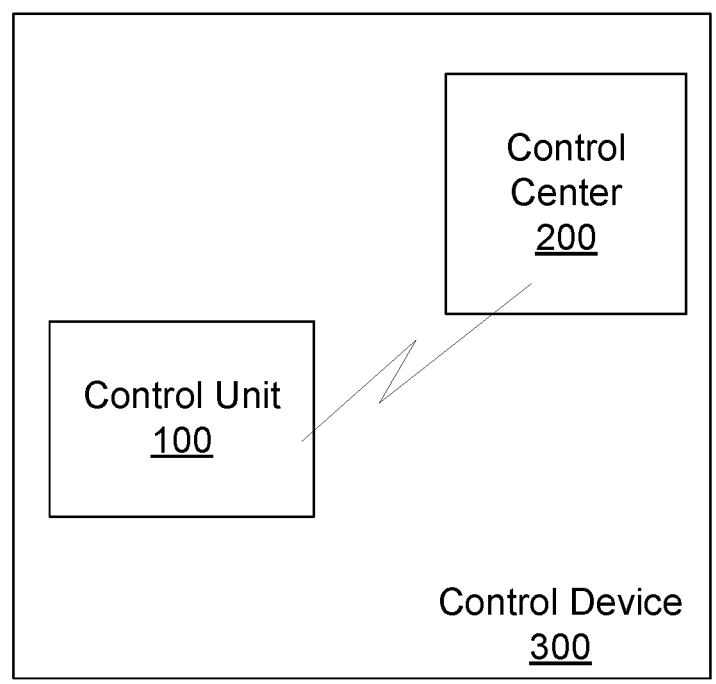
FIG. 2 schematically illustrates a control device according to an example.

FIG. 2 schematically illustrates a control device 300 associated with a vehicle 1 assembled from a set of modules 20 according to an example. The control device 300 may be associated with a vehicle 1 as disclosed in FIG. 1. The control device 300 may thus form part of the system 10 as disclosed in FIG. 1. The control device 300 may be implemented as a separate entity or may comprise a plurality of entities, such as control units or computers, as illustrated by the dashed boxes in the figure. The entities may be distributed in different modules 30, 40 of the vehicle 1 or the whole control device 300 may be comprised in one module 30, 40 of the vehicle 1. As mentioned above, the control device 300 may comprise control units 100 of the vehicle 1 and/or a control center 200 arranged in communication with the vehicle 1 and the modules 30, 40. The control device 300 is configured to identify an erroneous function of the at least one drive module 30 of the vehicle 1; physically connect an autonomously operated assisting drive module 30' (see FIG. 3 and FIG. 4a-b) to the at least one drive module 30; and control the assisting drive module 30' to perform at least the erroneous function of the at least one drive module 30.

The control device 300 may be configured to control the at least one drive module 30 and/or the assisting drive module 30' to lift the pair of wheels 32 of the at least one drive module 30 from the ground. The control device 300 may be configured to lift the pair of wheels 32 of the at least one drive module 30 from the ground by controlling a wheel suspension of the assisting drive module 30'. The control device 300 may be configured to control the wheel suspension of the assisting drive module 30', such that the body 31 of the assisting drive module 30' is raised in relation to the ground. The control device 300 may be configured to lift the wheel pair 32 of the at least one drive module 30 from the ground by controlling a wheel suspension of the at least one drive module 30. The control device 300 may be configured to control the wheel suspension of the at least one drive module 30, such that the body 31 of the at least one drive module 30 is lowered in relation to the ground. In another example, the control device 300 is configured to lift the wheel pair 32 of the at least on drive module 30 from the ground by emptying the tires of the wheel pair 32 of the at least one drive module 30.

The control device 300 may be configured to configure the at least one drive module 30 for tandem operation together with the assisting drive module 30'. The control device 300 may be configured to configure the at least one drive module 30 for tandem operation by adapting the steering angle of the at least one drive module 30.

The control device 300 may further be configured to, before physically connecting the assisting drive module 30', control the assisting drive module 30' to be autonomously operated to the location of the vehicle 1. The control device 300 may be configured to determine the location of the vehicle 1. The control device 300 may also be configured to instruct/command the assisting drive module 30' to drive to the location of the vehicle 1.

Furthermore, the control device 300 may be configured to appoint the assisting drive module 30' to operate as a master and thereby control the other modules 30, 40 of the vehicle 1. The control device 300 may also be configured to appoint the at least one drive module 30 to operate as a slave. The control device 300 may thus be configured to determine which module 30, 30', 40 to operate as a master and which module 30, 30', 40 to operate as a slave.

The control device 300 may be configured to determine which functions should be performed by the assisting drive module 30' and which functions should be performed by the at least one drive module 30. According to an example, the control device 300 is configured to control the assisting drive module 30' to drive the vehicle 1 by pushing or pulling the vehicle 1.

The control device 300 may be configured to physically connect the assisting drive module 30' to the vehicle 1 by controlling a physical interface of the assisting drive module 30' or by commanding a control unit 100 of the assisting drive module 30' to control a physical interface of the assisting drive module 30'. The control device 300 may be configured to physically connect the assisting drive module 30' to the vehicle 1 by controlling a physical interface of the at least one drive module 30 or by commanding a control unit 100 of the at least one drive module 30 to control a physical interface of the at least one drive module 30.

The control device 300 may further be configured to electrically connect the assisting drive module 30' with the vehicle 1. The control device 300 may be configured to electrically connect the assisting drive module 30' with the vehicle 1 by activating communication means 50 in the assisting drive module 30. The control device 300 may alternatively be configured to electrically connect the assisting drive module 30' with the vehicle 1 by commanding a control unit 100 of the assisting drive module 30 to activate communication means 50 in the assisting drive module 30'.

Figure 3:
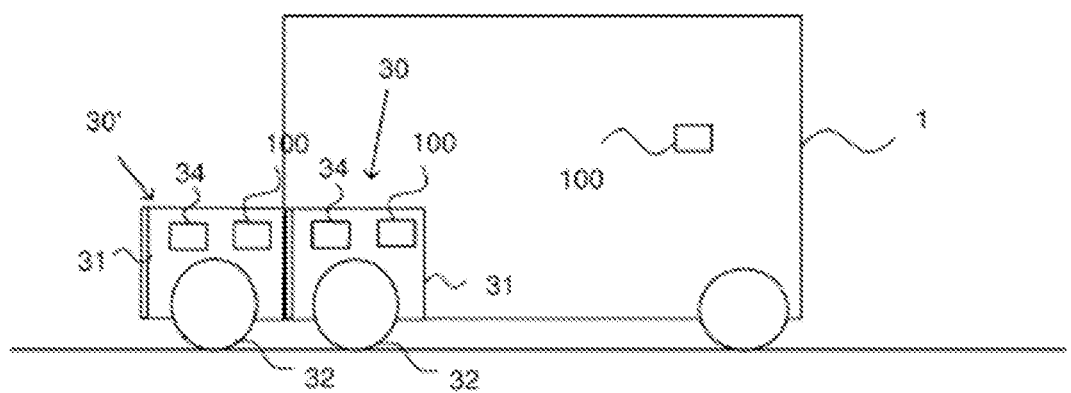
FIG. 3 schematically illustrates a scenario for a vehicle according to an example.

FIG. 3 schematically illustrates a scenario for a vehicle 1 assembled from a set of modules 20 according to an example. The vehicle 1 is configured as disclosed in FIG. 1. In this example, a control device 300 as disclosed in FIG. 2 has identified an erroneous function of the at least one drive module 30 of the vehicle 1. An assisting drive module 30' has been physically connected to the at least one drive module 30. In this example, the assisting drive module 30' has been physically connected to the at least one drive module 30 via corresponding physical interfaces 50. The body 31 of the assisting drive module 30' is physically connected to the body 31 of the at least one drive module 30. The assisting drive module 30 has also been controlled to perform at least the erroneous function of the at least one drive module 30.

In this example, the at least one drive module 30 has been configured for tandem operation together with the assisting drive module 30'. Thus, the vehicle 1 comprises a tandem axle arrangement consisting of the at least one drive module 30 and the assisting drive module 30' With a tandem arrangement, either both or only one of the drive modules 30, 30' may drive the vehicle 1. The at least one drive module 30 may have been configured for tandem operation by adapting the steering angle of the at least one drive module 30.

The assisting drive module 30' may further be electrically connected with the at least one drive module 30. The assisting drive module 30' may further be electrically connected with the at least one drive module 30 via corresponding electrical interfaces. The assisting drive module 30' may be electrically connected with the at least one drive module 30 by means of activated communication means in the assisting drive module 30'. The communication means may comprise an internal communication network, such as CAN J1939, Flexray, Ethernet, fiber or similar. The communication means may alternatively or additionally comprise a transmitter and/or a receiver for wireless communication.

Figure 4A:
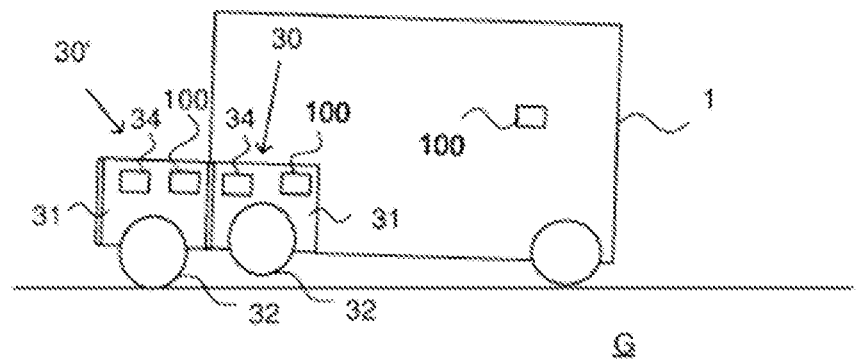
FIG. 4a-b schematically illustrate scenarios for a vehicle according to an example.
Figure 4B:
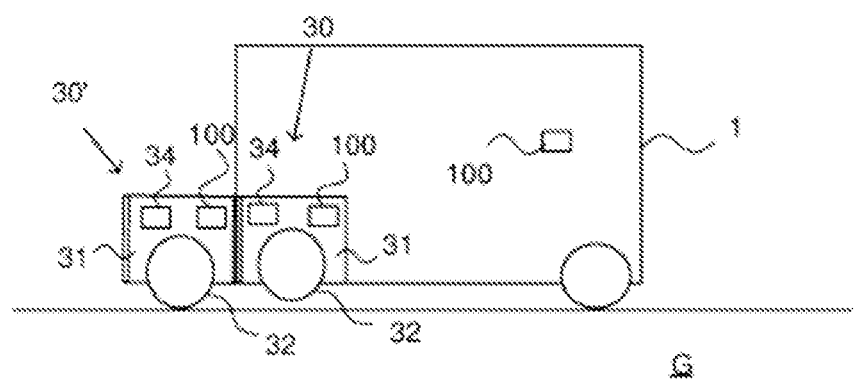

FIGS. 4a and 4b schematically illustrate different examples of scenarios relating to a vehicle 1 assembled from a set of module 20 as disclosed in FIG. 1. It is to be understood that the features illustrated in these examples may be combined with each other and with features disclosed in FIG. 3. In FIG. 4a, a control device 300 as disclosed in FIG. 2 has identified an erroneous function of the at least one drive module 30 of the vehicle. An assisting drive module 30' has been physically connected to the at least one drive module 30, and the assisting drive module 30 has been controlled to perform at least the erroneous function of the at least one drive module 30.

In this example, the assisting drive module 30' has been controlled to lift the pair of wheels 32 of the at least one drive module 30 from the ground G. This way, the malfunctioning drive module 30 will not interfere with the operation of the vehicle 1. A wheel suspension of the assisting drive module 30' has been controlled, such that the body 31 of the assisting drive module 30' is raised in relation to the ground G. Since the assisting drive module 30' is physically attached to the body 31 of the at least one drive module 30, the at least one drive module 30, and thus the end of the vehicle 1, will be lifted from the ground G.

In FIG. 4b, a control device 300 as disclosed in FIG. 2 has identified an erroneous function of the at least one drive module 30 of the vehicle. An assisting drive module 30' has been physically connected to the at least one drive module 30, and the assisting drive module 30 has been controlled to perform at least the erroneous function of the at least one drive module 30.

In this example, the at least one drive module 30 has been controlled to lift the pair of wheels 32 of the at least one drive module 30 from the ground G. A wheel suspension of the at least one drive module 30 has been controlled, such that the pair of wheels 32 of the at least one drive module 30 is raised in relation to the ground G. The tires of the pair of wheels 32 may additionally or alternatively be deflated.

Figure 5A:
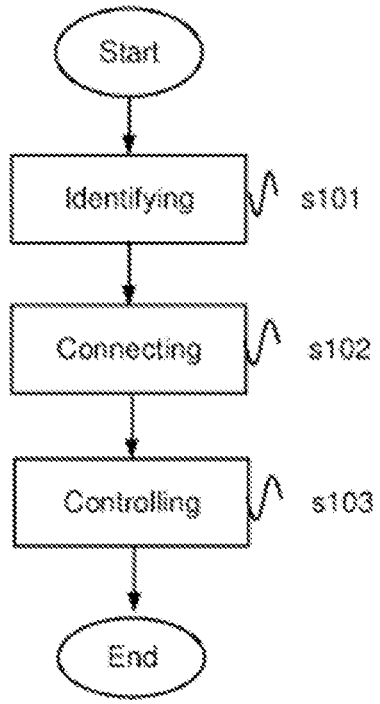
FIG. 5a-b illustrate flow charts for a method for a vehicle according to examples.

FIG. 5a illustrates a flow chart for a method, performed by a control device associated with a vehicle assembled from a set of modules. The method thus relates to the vehicle 1 as disclosed in FIG. 1 and the control device 300 as disclosed in FIG. 2. The vehicle 1 comprises at least one drive module 30 and at least one functional module 40, wherein the at least one drive module 30 comprises a pair of wheels 32 and is configured to be autonomously operated and drive the assembled vehicle 1. The method comprises: identifying s101 an erroneous function of the at least one drive module 30; physically connecting s102 an autonomously operated assisting drive module 30' to the at least one drive module 30; and controlling s103 the assisting drive module 30' to perform at least the erroneous function of the at least one drive module 30.

The step of identifying s101 an erroneous function of the at least one drive module 30 may comprise identifying an activated error code in the at least one drive module 30. Identifying s101 an erroneous function of the at least one drive module 30 may comprise receiving information about an activated error code in the at least one drive module 30. Alternatively, the step of identifying s101 an erroneous function may be based on collected data from different sensors of the at least one drive module 30 and/or the functional module 40.

Physically connecting s102 the assisting drive module 30' to the at least one drive module 30 may comprise controlling a physical interface 50 of the assisting drive module 30' and/or controlling a physical interface 50 of the at least one drive module 30. The physical interface 50 may comprise a coupling unit, quick coupling, a hook or similar. Physically connecting s102 the assisting drive module 30' to the at least one drive module 30 may as an example comprise controlling a coupling unit, a quick coupling, a hook or similar. Physically connecting s102 the assisting drive module 30' to the at least one drive module 30 may further comprise controlling the assisting drive module 30' to a position where the physical interface 50 of the assisting drive module 30' connects with the physical interface 50 of the at least one drive module 30.

Controlling s103 the assisting drive module 30' to perform at least the erroneous function of the at least one drive module 30 means that the assisting drive module 30' replaces the at least one drive module 30 at least with regard to the erroneous function(s) of the at least one drive module 30. Controlling s103 the assisting drive module 30' to perform at least the erroneous function of the at least one drive module 30 may comprise determining/selecting which functions the assisting drive module 30' should perform and which functions the at least one drive module 30 should perform.

The step of controlling s103 the assisting drive module 30' to perform at least the erroneous function may further comprise appointing the assisting drive module 30' to operate as a master and thereby control the other modules 30, 40 of the vehicle 1. The step may also comprise appointing the at least one drive module 30 to operate as a slave. The step of controlling s103 the assisting drive module 30' to perform at least the erroneous function may also comprise controlling the assisting drive module 30' to drive the vehicle 1 by pushing or pulling the vehicle 1.

Figure 5B:
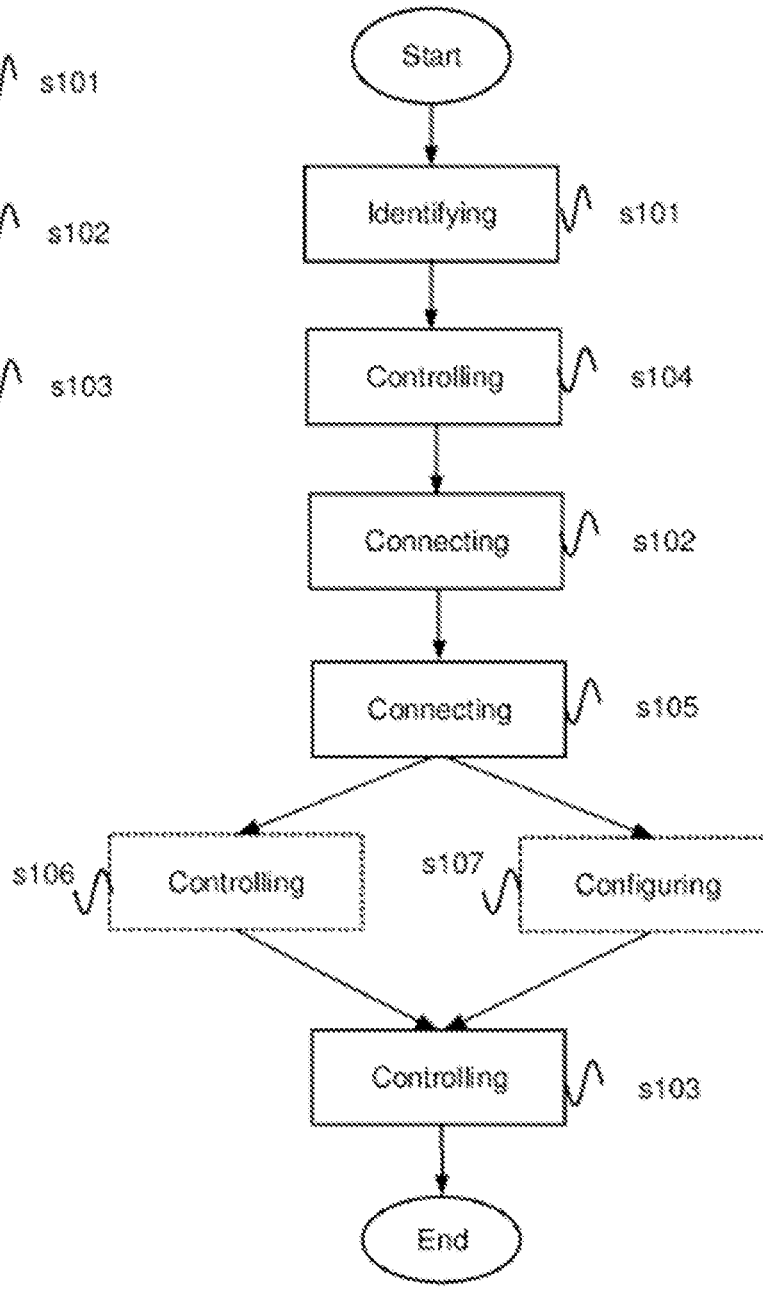

FIG. 5b illustrates a flow chart for a method, performed by a control device associated with a vehicle assembled from a set of modules according to an example. The method thus relates to the vehicle 1 as disclosed in FIG. 1 and the control device 300 as disclosed in FIG. 2. The vehicle 1 comprises at least one drive module 30 and at least one functional module 40, wherein the at least one drive module 30 comprises a pair of wheels 32 and is configured to be autonomously operated and drive the assembled vehicle 1. The method comprises the method steps as disclosed in FIG. 5a. The method thus comprises: identifying s101 an erroneous function of the at least one drive module 30; physically connecting s102 an autonomously operated assisting drive module 30' to the at least one drive module 30; and controlling s103 the assisting drive module 30' to perform at least the erroneous function of the at least one drive module 30.

The method further comprises the step of controlling s104 the assisting drive module 30' to be autonomously operated to the location of the vehicle 1. When an erroneous function has been identified s101, an assisting drive module 30' may be commanded to go to the location of the vehicle 1. The assisting drive module 30' may subsequently be autonomously operated/controlled to the location. The step of controlling s104 the assisting drive module 30' to the location of the vehicle 1 may also comprise determining the location of the vehicle 1. This may be performed based on map data, navigation systems or similar.

The method may further comprise electrically connecting s105 the assisting drive module 30' with the at least one drive module 30. This may be performed essentially at the same time as physically connecting s102 the assisting drive module 30'. Electrically connecting s105 the assisting drive module 30' with the at least one drive module 30 may comprise activating communication means in the assisting drive module 30'.

In this example, the method further comprises the optional step of controlling s106 the at least one drive module 30 and/or the assisting drive module 30' to lift the pair of wheels 32 of the at least one drive module 30 from the ground G. This step may be performed prior to controlling s103 the assisting drive module 30 to perform at least the erroneous function. Controlling s106 the at least one drive module 30 and/or the assisting drive module 30' to lift the pair of wheels 32 of the at least one drive module 30 from the ground may comprise controlling the wheel suspension of the assisting drive module 30'. By controlling the wheel suspension the body 31 of the assisting drive module 30' can be raised or lowered in relation to the ground G on which the assisting drive module 30' is standing. The wheel suspension of the assisting drive module 30' may be controlled, such that the body 31 of the assisting drive module 30' is raised in relation to the ground G. Since the body 31 of the assisting drive module 30' is physically attached to the body 31 of the at least one drive module 30, the at least one drive module 30, and thus the end of the vehicle 1, will be lifted from the ground G when the body 31 of the assisting drive module 30' is raised. Alternatively, controlling s106 the at least one drive module 30 and/or the assisting drive module 30' to lift the pair of wheels 32 of the at least one drive module 30 from the ground G may comprise controlling the wheel suspension of the at least one drive module 30. The wheel suspension of the at least one drive module 30 may be controlled, such that the body 31 of the at least one drive module 30 normally would be lowered in relation to the ground G. Since the body 31 of the at least one drive module 30 is connected to the body 31 of the assisting drive module 30', the body 31 of the at least one drive module 30 will not be lowered but the wheel pair 32 of the at least one drive module 30 will instead be lifted from the ground G.

In this example, the method further comprises the optional step of configuring s107 the at least one drive module 30 and/or the assisting drive module 30' for tandem operation. This step may be performed prior to controlling s103 the assisting drive module 30 to perform at least the erroneous function. Configuring s107 the at least one drive module 30 and/or the assisting drive module 30' for tandem operation may comprise configuring the propulsion of the at least one drive module 30 and/or the assisting drive module 30'. Configuring s107 the at least one drive module 30 and/or the assisting drive module 30' for tandem operation may comprise adapting the steering angle of the at least one drive module 30 to the steering angle of the assisting drive module 30' or vice versa. Configuring s107 the at least one drive module 30 for tandem operation is only performed when the pair of wheels 32 of the at least one drive module 30 is not lifted from the ground G.

Figure 6:
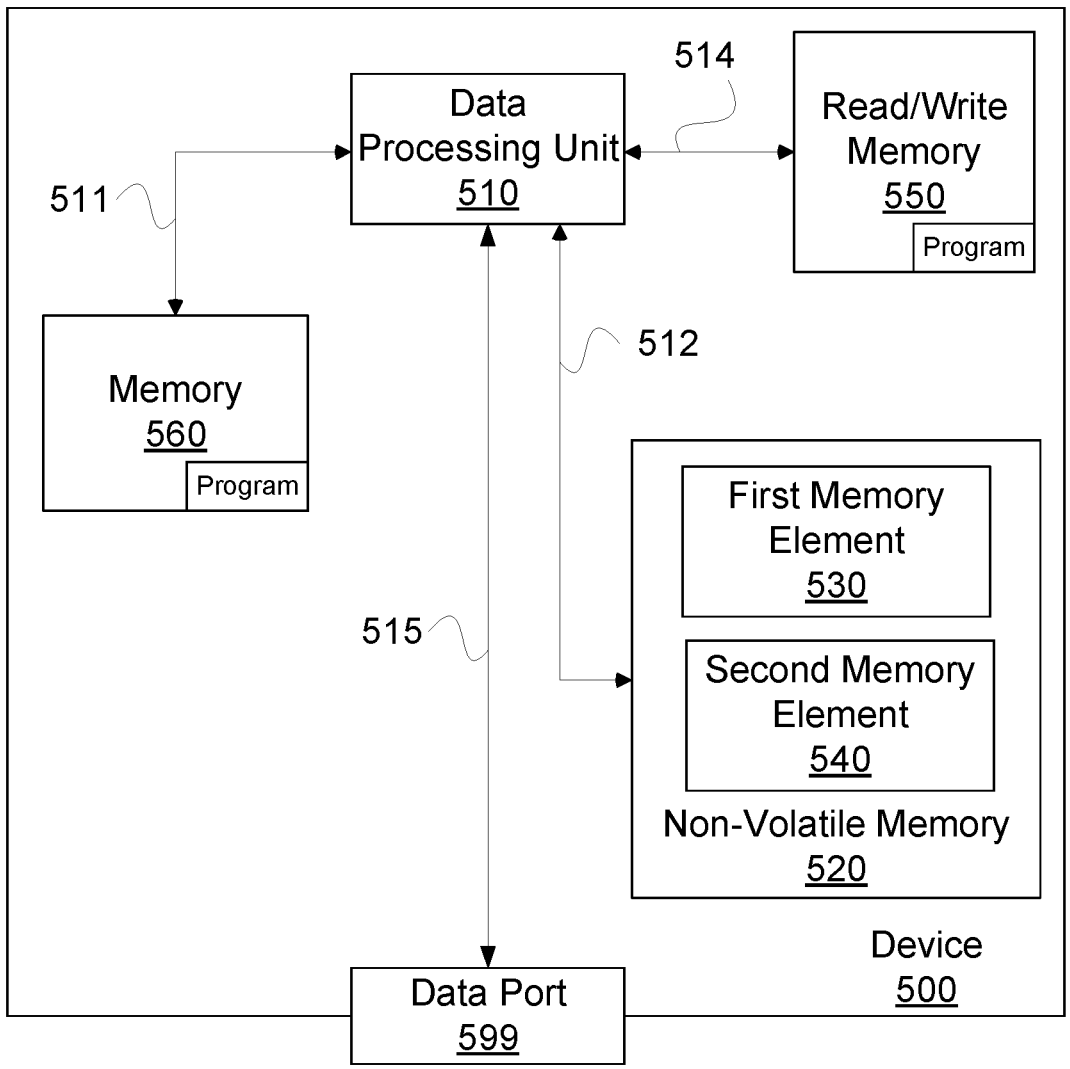
FIG. 6 schematically illustrates a control device or computer according to an example.

FIG. 6 is a diagram of a version of a device 500. The control device 300 described with reference to FIG. 1 and FIG. 2 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises routines for identifying an erroneous function of at least one drive module. The computer programme P further comprises routines for physically connecting an assisting drive module to the at least one drive module; and controlling the assisting drive module to perform at least the erroneous function. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510, which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method, performed by a control device associated with a vehicle assembled from a set of modules, the vehicle comprising: at least one drive module; and at least one functional module, wherein the at least one drive module comprises a pair of wheels and is configured to be autonomously operated and drive the vehicle, the method comprising:
    identifying an erroneous function of the at least one drive module;
    physically connecting an autonomously operated assisting drive module to the at least one drive module;
    controlling the at least one drive module and/or the assisting drive module to lift the pair of wheels of the at least one drive module from the ground so as to prevent the drive module from interfering with operation of the vehicle; and
    controlling the assisting drive module to operate with the functional module of the vehicle and to perform at least the erroneous function of the at least one drive module.

2. The method according to claim 1, further comprising:
    configuring the at least one drive module and/or the assisting drive module for tandem operation.

3. The method according to claim 2, wherein configuring the at least one drive module and/or the assisting drive module for tandem operation comprises adapting a steering angle of the at least one drive module.

4. The method according to claim 1, wherein identifying an erroneous function comprises identifying an erroneous function related to hardware of the at least one drive module and/or identifying an erroneous function related to software of the at least one drive module.

5. The method according to claim 1, further comprising:
    electrically connecting the assisting drive module with the vehicle.

6. The method according to claim 1, further comprising, before physically connecting the assisting drive module:
    controlling the assisting drive module to be autonomously operated to a location of the vehicle.

7. The method according to claim 1, wherein controlling the assisting drive module to perform at least the erroneous function comprises appointing the assisting drive module to operate as a master and thereby control the modules of the vehicle.

8. The method according to claim 1, wherein controlling the assisting drive module to perform at least the erroneous function comprises controlling the assisting drive module to drive the vehicle by pushing or pulling the vehicle.

9. A computer program product comprising computer program code stored on a non-transitory computer-readable medium, said computer program product configured for operation with a vehicle assembled from a set of modules, the vehicle comprising: at least one drive module; and at least one functional module, wherein the at least one drive module comprises a pair of wheels and is configured to be autonomously operated and drive the vehicle, said computer program code comprising computer instructions to cause one or more control units to perform the following operations:
    identifying an erroneous function of the at least one drive module;
    physically connecting an autonomously operated assisting drive module to the at least one drive module;
    controlling the at least one drive module and/or the assisting drive module to lift the pair of wheels of the at least one drive module from the ground so as to prevent the drive module from interfering with operation of the vehicle; and
    controlling the assisting drive module to operate with the functional module of the vehicle and to perform at least the erroneous function of the at least one drive module.

10. A control device associated with a vehicle assembled from a set of modules, the vehicle comprising: at least one drive module; and at least one functional module, wherein the at least one drive module comprises a pair of wheels and is configured to be autonomously operated and drive the vehicle, the control device configured to:
    identify an erroneous function of the at least one drive module;
    physically connect an autonomously operated assisting drive module to the at least one drive module;
    controlling the at least one drive module and/or the assisting drive module to lift the pair of wheels of the at least one drive module from the ground so as to prevent the drive module from interfering with operation of the vehicle; and control the assisting drive module to operate with the functional module of the vehicle and to perform at least the erroneous function of the at least one drive module.

11. The control device according to claim 10, wherein the control device is configured to configure the at least one drive module and/or the assisting drive module for tandem operation.

12. The control device according to claim 11, wherein the control device is configured to adapt the steering angle of the at least one drive module.

13. The control device according to claim 10, further being configured to, before physically connecting the assisting drive module, control the assisting drive module to be autonomously operated to a location of the vehicle.

14. The control device according to claim 10, wherein the control device is configured to appoint the assisting drive module to operate as a master and thereby control the modules of the vehicle.

15. The control device according to claim 10, wherein the control device is configured to control the assisting drive module to drive the vehicle by pushing or pulling the vehicle.

16. The control device according to claim 10, wherein the control device is comprised in the vehicle and/or the assisting drive module and/or in a control center arranged in communication with the vehicle and the assisting drive module.

17. A system comprising:
an assembled vehicle comprising at least one drive module; and at least one functional module, wherein the at least one drive module comprises a pair of wheels and is configured to be autonomously operated and drive the vehicle;
an assisting drive module;
a control center; and
a control device configured to:
identify an erroneous function of the at least one drive module;
physically connect an autonomously operated assisting drive module to the at least one drive module;
controlling the at least one drive module and/or the assisting drive module to lift the pair of wheels of the at least one drive module from the ground so as to prevent the drive module from interfering with operation of the vehicle; and
control the assisting drive module to operate with the functional module of the vehicle and to perform at least the erroneous function of the at least one drive module.

18. The control device according to claim 10 configured to operate computer program code stored on a non-transitory computer-readable medium comprising computer instructions that cause the control device to perform the recited operations of:
identify an erroneous function of the at least one drive module;
physically connect an autonomously operated assisting drive module to the at least one drive module; and
control the assisting drive module to perform at least the erroneous function of the at least one drive module.

19. The system according to claim 17, wherein the control device is configured to operate computer program code stored on a non-transitory computer-readable medium comprising computer instructions that cause the control device to perform the recited operations of:
identify an erroneous function of the at least one drive module;
physically connect an autonomously operated assisting drive module to the at least one drive module; and
control the assisting drive module to perform at least the erroneous function of the at least one drive module.

* * * * *